US010890286B2

(12) United States Patent
Ellis et al.

(10) Patent No.: US 10,890,286 B2
(45) Date of Patent: Jan. 12, 2021

(54) PRESSURE REGULATED COUPLING MANIFOLD ASSEMBLY

(71) Applicant: Parker-Hannifin Corporation, Cleveland, OH (US)

(72) Inventors: Shawn D. Ellis, Plymouth, MN (US); Todd D. Lambert, Brooklyn Park, MN (US); Paul E. Lemay, Shoreview, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 16/354,471

(22) Filed: Mar. 15, 2019

(65) Prior Publication Data
US 2019/0323641 A1   Oct. 24, 2019

Related U.S. Application Data

(60) Provisional application No. 62/660,578, filed on Apr. 20, 2018.

(51) Int. Cl.
| F16K 15/20 | (2006.01) |
| F16L 37/244 | (2006.01) |
| F16L 37/08 | (2006.01) |
| F16L 17/06 | (2006.01) |
| F16L 37/06 | (2006.01) |

(Continued)

(52) U.S. Cl.
CPC .............. *F16L 37/244* (2013.01); *F16L 17/06* (2013.01); *F16L 17/10* (2013.01); *F16L 37/06* (2013.01); *F16L 37/08* (2013.01); *F16L 37/367* (2013.01); *B60C 29/064* (2013.01); *Y10T 137/3584* (2015.04)

(58) Field of Classification Search
CPC ........ B60C 29/064; F16L 17/06; F16L 17/10; F16L 37/00; F16L 37/08; F16L 37/24; F16L 37/244; F16L 37/248; Y10T 137/3584; Y10T 137/36; Y10T 137/3724; Y10T 137/7793; Y10T 137/7822; Y10T 137/7823; Y10T 137/7826; Y10T 137/87877
See application file for complete search history.

(56) References Cited

U.S. PATENT DOCUMENTS 2,869,573 A * 1/1959 Stafford ................ B60C 29/064
137/223
3,139,902 A * 7/1964 Thomas ............. G05D 16/0619
137/557

(Continued)

FOREIGN PATENT DOCUMENTS

DE        202016105607        1/2018

*Primary Examiner* — Robert K Arundale
(74) *Attorney, Agent, or Firm* — Renner, Otto, Boisselle & Sklar, LLP

(57) ABSTRACT

A coupling manifold assembly has both regulated and unregulated flow orientations and includes a manifold body and a pressure regulator couplably received into the manifold body. The manifold body includes a pair of connection ports between which flow is movable through the manifold body, with the pressure regulator being received into a flow path between the connection ports. The pressure regulator is configured to regulate flow in a first direction between the connection ports and to allow for unregulated flow in an opposite second direction between the connection ports.

13 Claims, 10 Drawing Sheets

(51) Int. Cl.
*F16L 17/10* (2006.01)
*F16L 37/367* (2006.01)
*B60C 29/06* (2006.01)

(56) References Cited

U.S. PATENT DOCUMENTS

| | | |
|---|---|---|
| 3,834,417 A | 9/1974 | Holben et al. |
| 4,791,957 A | 12/1988 | Ross |
| 5,711,340 A * | 1/1998 | Gusky ................ G05D 16/0663 137/116.5 |
| 5,855,222 A * | 1/1999 | Jou ......................... B05B 1/005 137/223 |
| 6,382,242 B1 | 5/2002 | Gallant et al. |
| 2006/0278230 A1 | 12/2006 | Nguyen |
| 2018/0259980 A1* | 9/2018 | Huang ................ G05D 16/107 |

* cited by examiner

PRESSURE REGULATED COUPLING MANIFOLD ASSEMBLY

RELATED APPLICATIONS

This application claims the benefit of U.S. Provisional Application No. 62/660,578 filed Apr. 20, 2018, the contents of which are incorporated herein by reference.

FIELD OF INVENTION

The present invention relates generally to a coupling manifold assembly for use in a flow system having reversible flow directions, and more particularly to a coupling manifold assembly that is configured both to regulate flow in a first flow orientation and also to allow unregulated flow when used in a second flow orientation.

BACKGROUND

In some flow systems providing continued flow of a fluid, such as a liquid, gas or combination thereof, the ability to account for an interruption in flow by attaching to an alternative flow system is an important feature. For example, with respect to flow systems providing breathable air, an important feature of flow regulating assemblies of such flow systems is the capability of allowing for buddy breathing. In a situation where flow from a first flow source to a first breathing apparatus of a first individual is compromised, it is important that a coupling manifold assembly attached to the first breathing apparatus be able to quickly and easily be coupled to, and to allow for flow from, a corresponding coupling manifold assembly connected to a second breathing apparatus and respective second flow source of a second individual. An example usage would be buddy breathing by firefighters in a fire rescue situation in which breathing air may be limited.

SUMMARY OF INVENTION

The present invention provides a coupling manifold assembly couplable to another identical coupling manifold assembly to quickly and easily allow for buddy breathing without disconnection of any hoses, breathing apparatuses or gas tanks being necessary. The coupling manifold assembly is configured regulate flow when used in a first flow orientation, such as when coupled to a flow system having active flow. The same coupling manifold assembly also is configured to allow for unregulated flow through the coupling manifold assembly when used in a second and reverse flow orientation. For example, when a first coupling manifold assembly is coupled to a first flow system having compromised flow, the first coupling manifold assembly may be connected in the reverse flow orientation to a corresponding copy of the coupling manifold assembly that is receiving active flow such as from a second flow system. In this manner, the first coupling manifold assembly allows for unregulated flow of the regulated flow received from the corresponding copy of the coupling manifold assembly.

Generally, the coupling manifold assembly has both regulated and unregulated flow orientations and includes a manifold body and a pressure regulator couplably received into the manifold body. The manifold body includes a pair of connection ports between which flow is movable through the manifold body, with the pressure regulator being received into a flow path between the connection ports. The pressure regulator is configured to regulate flow in a first direction between the connection ports and to allow for unregulated flow in an opposite second direction between the connection ports.

The coupling manifold assembly is configured to provide a compact arrangement, such as an arrangement in which the coupling manifold is carried on an individual for use as a backup attachment, for example in a buddy breathing arrangement. The flow passage configuration within the manifold body and the orientation of the ports at the outer periphery of the manifold body aid in minimizing the overall volume and outer profile of the coupling manifold assembly.

According to one aspect of the invention, a coupling manifold assembly includes a manifold body having a pair of connection ports between which flow is movable through the manifold body, and a pressure regulator couplably received into the manifold body. The pressure regulator extends into a flow path in the manifold body between the connection ports, and the pressure regulator is configured to regulate flow in a first direction between the connection ports and to allow for unregulated flow in an opposite second direction between the connection ports.

The manifold body may extend along a longitudinal axis between opposing first and second axial ends and wherein at least one of the connection ports or a regulator port into which the pressure regulator is received is disposed at each of the opposing first and second axial ends.

The manifold body may further include a first passage defining a first portion of the flow path extending between a first connection port of the connection ports and the pressure regulator, and a second passage defining a second portion of the flow path extending between a second connection port of the connection ports and the pressure regulator, wherein the first passage and the second passage are disposed adjacent to one another, and wherein the first passage and the second passage are disposed laterally spaced from one another along their full lengths along the longitudinal axis of the manifold body.

The manifold body may have a length extending along a longitudinal axis between opposing first and second axial ends and a height extending orthogonal to the length, wherein the pressure regulator is received into a regulator port at one of the first and second axial ends and spaced along the height from one of the connection ports disposed at the respective first or second axial end having the regulator port.

The manifold body may have a length extending along a longitudinal axis between opposing first and second axial ends, a lateral width extending orthogonal to the length between opposing lateral sides of the manifold body, and a height extending orthogonal to each of the length and the lateral width of the manifold body, wherein the length is greater than either of the lateral width or the height.

Each of the connection ports and a regulator port into which the pressure regulator is couplably received may extend along respective central longitudinal axes, with each of the respective central longitudinal axes extending parallel to one another.

The pressure regulator may extend outwardly from the manifold body such that an exterior portion of the pressure regulator not received into the manifold body does not extend circumferentially beyond an outermost periphery of the manifold body circumscribing both of the connection ports.

The pressure regulator may be manually adjustable to adjust the pressure of flow allowed through the manifold body in one of the first direction or the second direction The pressure regulator may include a valve portion having a valve member biased against a valve seat, and the valve portion is disposed between and configured to fluidly separate the connection ports from one another within the manifold body.

The coupling manifold assembly may further include a coupling received into one of the connection ports and a flexible sealing member connectable to the coupling to seal the respective connection port.

The flexible sealing member may have a tail end configured to circumscribe a connection received into the other of the connection ports.

A manifold system may include a first coupling manifold assembly and a second manifold assembly each according to one of the above embodiments of the coupling manifold assembly, wherein the first and second coupling manifold assemblies are connected to one another such that regulated flow moving in the first direction through the first coupling manifold assembly is receivable at the second coupling manifold assembly and enabled to move unregulated in the second direction through the second coupling manifold assembly.

According to another aspect of the invention, a coupling manifold assembly includes a manifold body extending along a longitudinal axis between first and second axial ends, a first port at the first axial end for receiving a coupling connectable to one of a flow source or an outlet device, a second port at the second axial end for receiving a coupling connectable to the other of the flow source or the outlet device, and a regulator port at one of the first axial end or the second axial end that extends to a regulator port cavity within the manifold body for receiving a pressure regulator, the regulator port being spaced apart from the first port along the first axial end or spaced apart from the second port along the second axial end. A pressure regulator is received in the regulator port and into the regulator port cavity, wherein the pressure regulator is configured to regulate only flow moving in one of a first direction from the first port through the regulator port cavity to the second port or a second direction from the second port through the regulator port cavity to the first port, and wherein the pressure regulator is configured to allow unregulated flow moving in the other of the first direction and the second direction.

A first flow passage may extend from the first port to the regulator port cavity at a first portion of the pressure regulator, and a second flow passage may extend from the second port to the regulator port cavity at a second portion of the pressure regulator fluidly sealable from the first portion of the pressure regulator.

The manifold body may include a third port that is connected within the manifold body to a flow passage within the manifold body extending between the second port and the regulator port cavity.

The pressure regulator may extend outwardly from the first axial end or the second axial end of the manifold body such that an exterior portion of the pressure regulator not received into the manifold body does not extend circumferentially beyond an outermost periphery of the manifold body circumscribing the respective first axial end or second axial end of the manifold body from which the pressure regulator extends outwardly.

Each of the first port, the second port and the regulator port may extend along respective central longitudinal axes, with each of the respective central longitudinal axes extending along a common plane of the manifold body.

A manifold system may include a first coupling manifold assembly and a second manifold assembly each according to an above-provided embodiment of the coupling manifold assembly, wherein the second port of the first coupling manifold assembly is fluidly connected to the second port of the second coupling manifold assembly, and a flow path extending between the respective first ports of the first and second coupling manifold assemblies and through each of the second ports of the first and second coupling manifold assemblies is regulated via only one of the first coupling manifold assembly or the second coupling manifold assembly.

According to yet another aspect of the invention, a coupling manifold assembly includes a manifold body extending along a longitudinal axis between first and second axial ends, a first port extending into the first axial end for receiving a coupling connectable to a flow source, a pair of second axial end ports extending into the second axial end for receiving a coupling connectable to an outlet device, the pair of second axial end ports being spaced from one another along the second axial end, and a regulator port extending into the first axial end to a regulator port cavity within the manifold body for receiving a pressure regulator, the regulator port being spaced apart from the first port along the first axial end. A pressure regulator is received in the regulator port and into the regulator port cavity, the pressure regulator having a valve portion of the pressure regulator disposed in a path of flow extending from the first port to the second port, and the valve portion having a valve member biased against a valve seat. A first flow passage etends from the first port to the regulator port cavity at a first side of the valve seat, and a second flow passage extends from the pair of second axial end ports to the regulator port cavity at a second side of the valve seat fluidly sealable from the first side of the valve seat via biasing of the valve member into engagement with the valve seat. The pair of second axial end ports are connected within the manifold body to one another along the second flow passage intermediary of a connection of each of the second axial end ports to the regulator port cavity. The pressure regulator is configured to regulate only flow moving in a first flow direction from the first port through the valve portion to the pair of second axial end ports and is configured to allow unregulated flow moving in an opposite second direction from the pair of second axial end ports through the valve portion to the first port.

The pair of second axial end ports may be spaced from one another along the second axial end in the same direction as which the first port and the regulator port are spaced from one another along the opposing first axial end.

The foregoing and other features of the invention are hereinafter fully described and particularly pointed out in the claims, the following description and annexed drawings setting forth in detail certain illustrative embodiments of the invention, these embodiments being indicative, however, of but a few of the various ways in which the principles of the invention may be employed.

DETAILED DESCRIPTION

Figure 1:
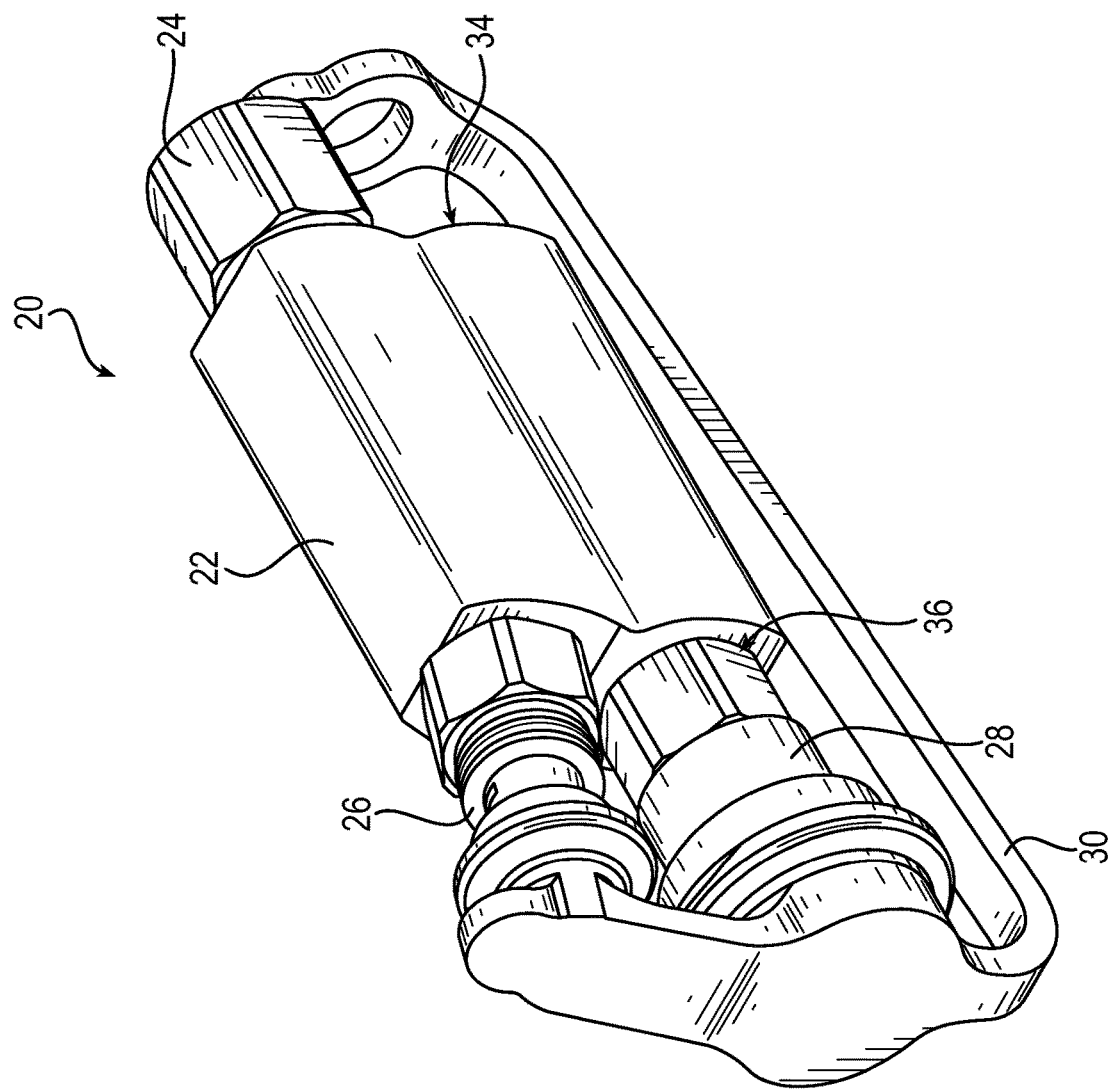
FIG. 1 is a perspective view of coupling manifold assembly according to the present invention.
Figure 2:
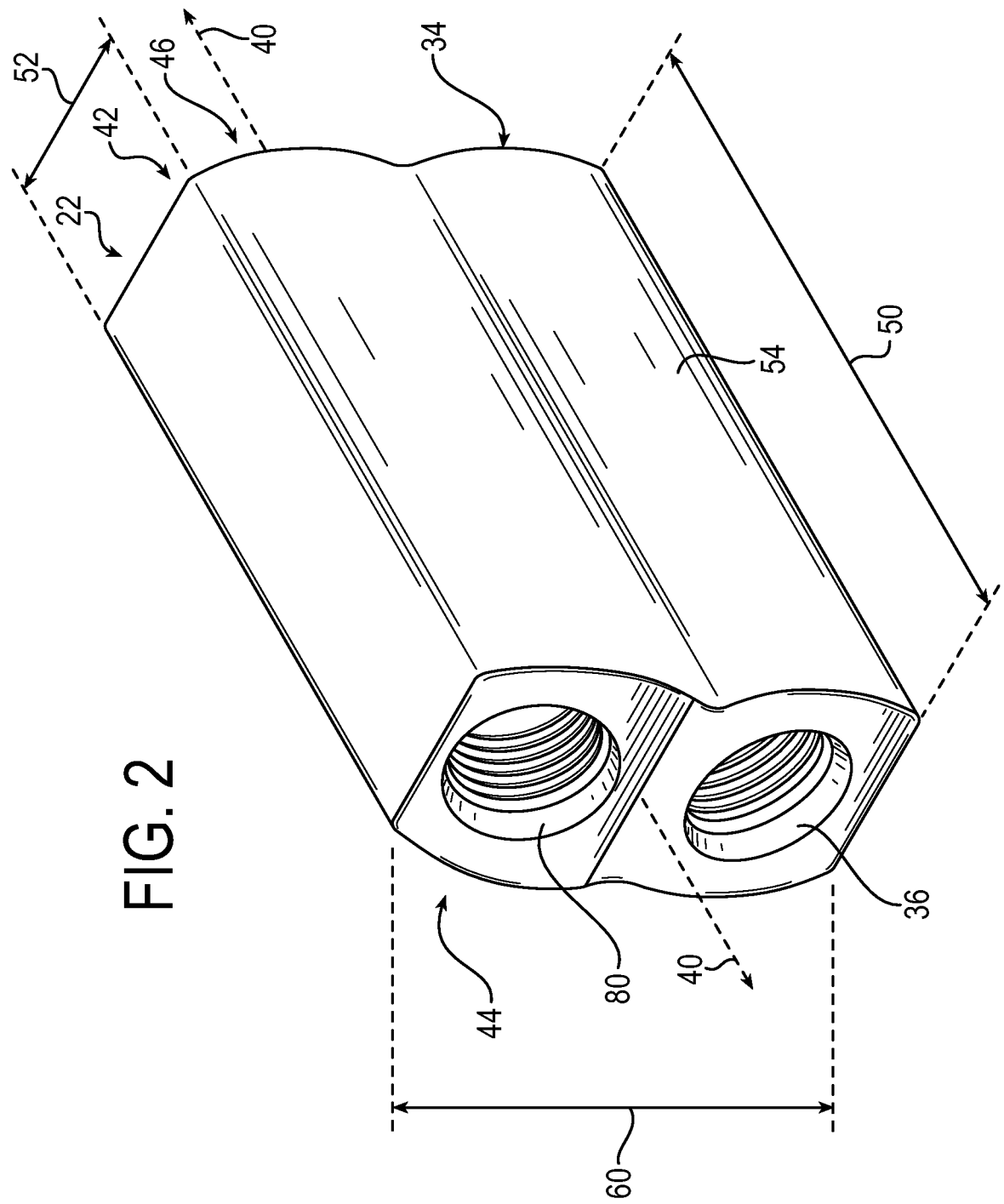
FIG. 2 is a perspective view of the manifold body of the coupling manifold assembly of FIG. 1.

Embodiments of the present invention will now be described with reference to the drawings, wherein like reference numerals are used to refer to like elements throughout. It will be understood that the figures are not necessarily to scale.

The principles of the present disclosure have general application to a coupling manifold assembly configured to regulate flow in a first direction through the coupling manifold assembly and to allow for unregulated flow in an opposite and second direction through the coupling manifold assembly. The principles have particular application to a coupling manifold assembly for regulating flow of gas, such as breathing air, when used in a first regulated orientation, and for preventing regulation of flow when used in a reversed flow orientation.

While the principles of the present invention are particularly described herein with respect to flow of breathing air, such as for use in a breathing air regulating system, the principles also may have application to flow of any suitable fluid, such as a liquid, gas, or combination thereof, whether for use independent of or in tandem with another of the coupling manifold assemblies.

Generally, the coupling manifold assembly is configured to regulate incoming fluid and to allow for coupling to an outlet flow device, such as a breathing apparatus, while also being capable of preventing this regulation of flow when used in an orientation that has generally reverse flow in respect to the regulated orientation. For example, an outlet device, such as a breathing regulator, may be coupled to the coupling manifold assembly with the coupling manifold assembly operating as a flow regulating manifold. Alternatively, a gas supply may be coupled to the coupling manifold assembly with the coupling manifold assembly in a reversed flow orientation and operating as a non-regulating coupling manifold. Such use is not dependent on coupling to another of the coupling manifold assemblies.

The coupling manifold assembly is configured for attachment to another coupling manifold assembly according to the present invention, whereby a pair of coupling manifold assemblies may be intercoupled in reverse flow orientations relative to one another. In such case, the coupling manifold assembly may operate as a safety backup assembly of a breathing air regulating system. The coupling manifold assembly may be coupled to an air supply, such as an air tank, with a separate breathing regulator also attached to the air supply. The coupling manifold assembly may have a length of hose coupled between the air tank and the coupling manifold assembly, with the hose in a wound configuration and the coupling manifold assembly being retained with the air tank and connected to the air tank for use in case of an emergency.

In an instance when multiple breathing air regulating systems are being used by different individuals, such as being worn by a number of firefighters, for example, the coupling manifold assemblies of the respective breathing air regulating systems will allow for buddy breathing. In such case, when flow is compromised or supply is low with respect to a first regulating system, the coupling manifold assemblies of respective regulating systems are configured to intercouple to one another, such as without additional components. The coupling manifold assembly of the first compromised regulating system may be connected to the coupling manifold assembly of another uncompromised regulating system. In such instance, with air moving through each of the intercoupled coupling manifold assemblies from an air tank to an outlet device or breathing regulator, one of the intercoupled coupling manifold assemblies will regulate air, while the second intercoupled coupling manifold assembly will allow for unregulated flow of air.

Turning now to FIG. 1, a coupling manifold assembly 20 according to the present invention is shown fully assembled. The coupling manifold assembly 20 includes a manifold body 22, a pressure regulator 24, a male coupling 26 and a female coupling 28. A sealing member 30 is configured to connect to and seal each of the male coupling 26 and the female coupling 28.

Generally, the manifold body 22 includes at least a pair of connection ports 34 and 36 between which flow is movable through the manifold body 22. For example, flow may move between a first connection port 34 and a second connection port 36 to which the male coupling 26 or the female coupling 28 may be coupled. One of the connection ports 34 or 36 is provided for receiving a coupling connectable to a flow source (flow supply), while the other of the connection ports 34 or 36 is provided for receiving a coupling for connecting to an outlet device, such as a breathing apparatus. As indicated, one of the male coupling 26 or the female coupling 28 may serve as one of the couplings.

It will be appreciated that the coupling manifold assembly 20 may be provided including less than the illustrated components. For example, any one of the male coupling 26, the female coupling 28, or the sealing member 30 may be omitted in an alternative embodiment.

The pressure regulator 24 is couplably received into the manifold body 22 and is provided for regulating flow through the manifold body 22 between the first connection port 34 and the second connection port 36. Particularly, the pressure regulator 24 is configured to regulate flow in a first direction between the connection ports 34 and 36 and to allow for unregulated flow in an opposite and second direction between the connection ports 34 and 36. Thus either of the connection port 34 or the connection port 36 may be an inlet, with the other of the connection port 34 or the connection ports 36 being an outlet.

Figure 3:
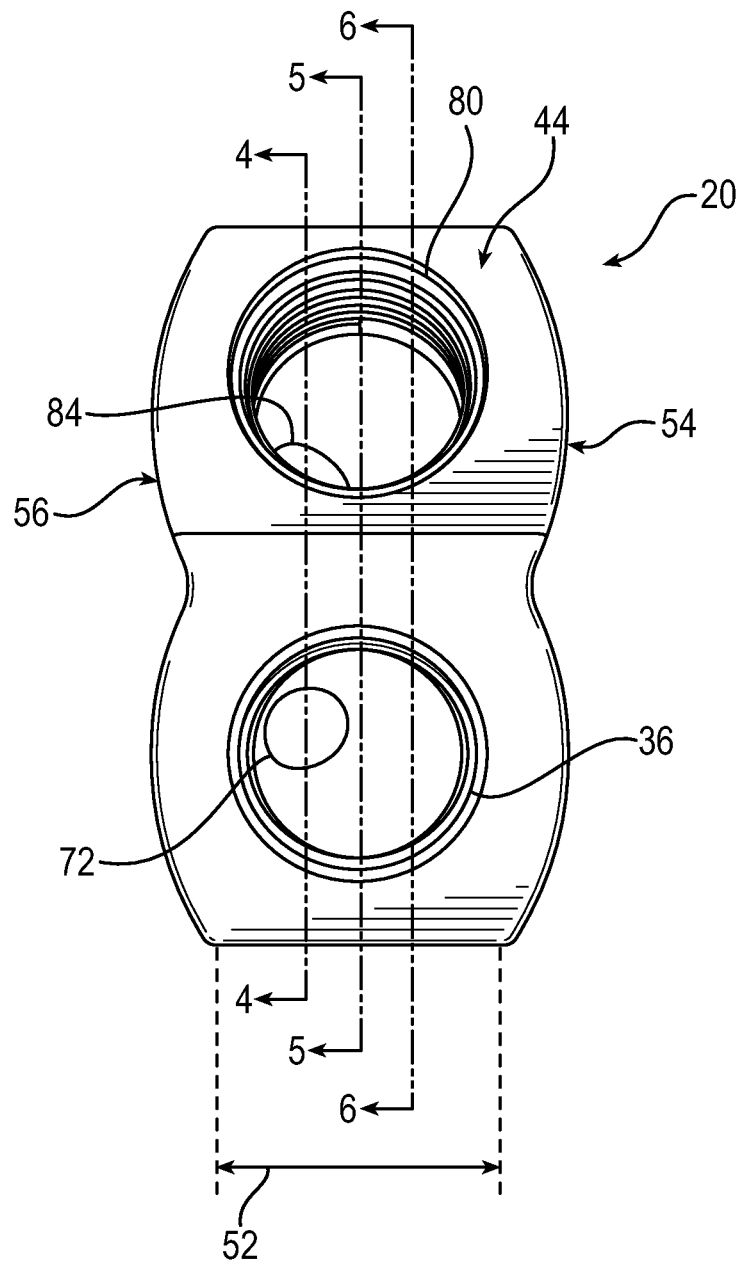
FIG. 3 is a view from one axial end of the manifold body of FIG. 2.
Figure 4:
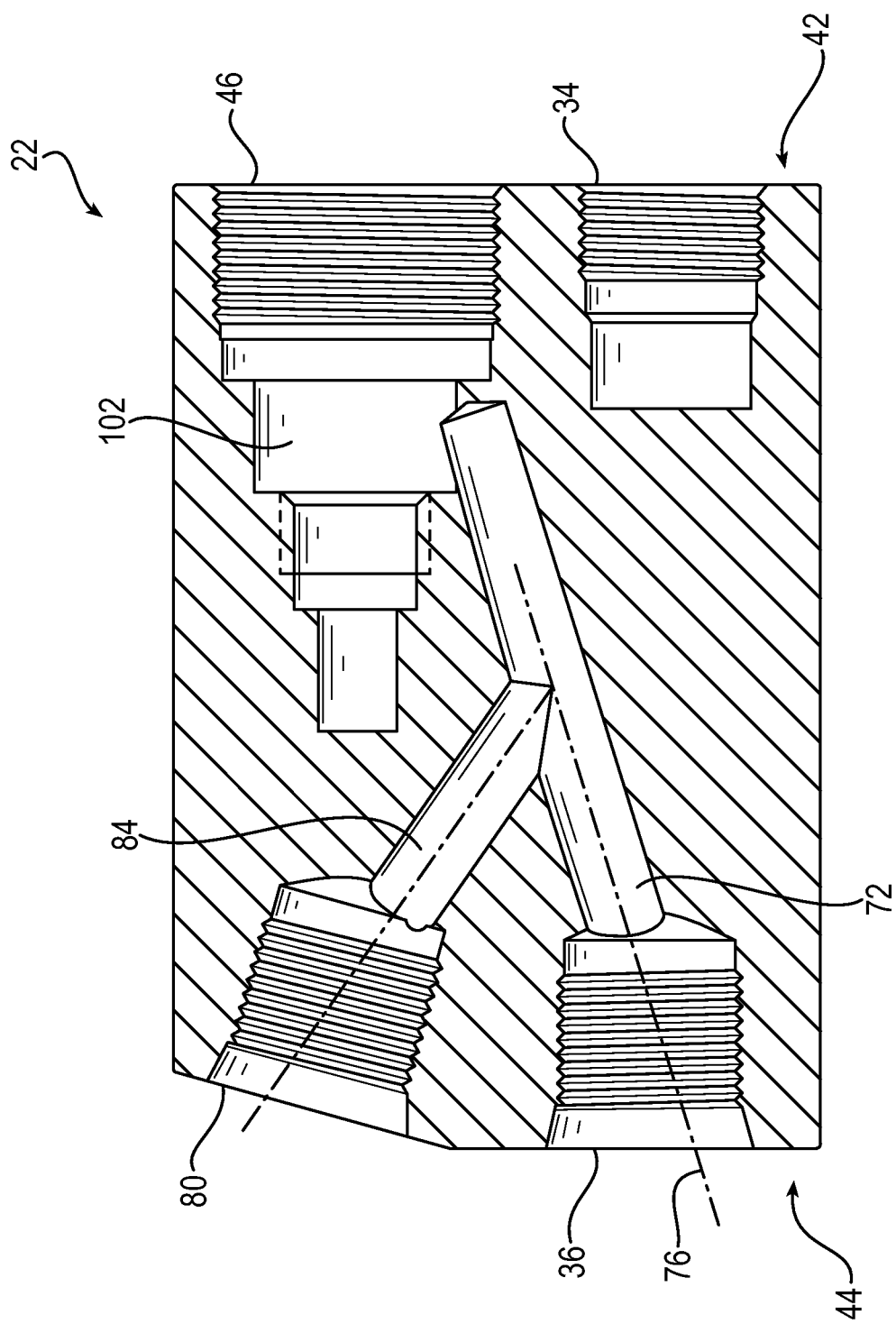
FIG. 4 is a cross-sectional view of the manifold body of FIG. 2 taken along the plane 4-4 illustrated in FIG. 3.
Figure 5:
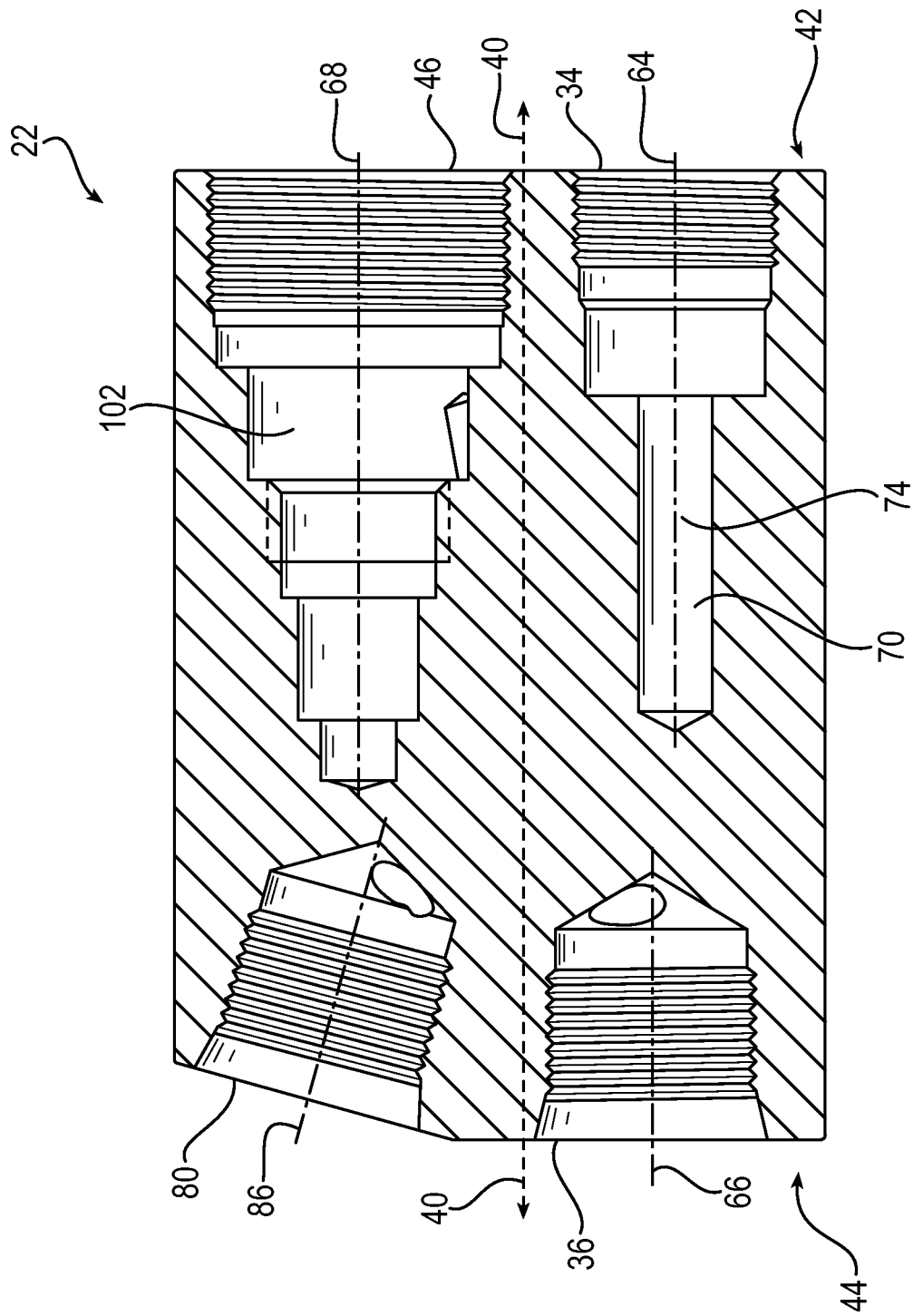
FIG. 5 is a cross-sectional view of the manifold body of FIG. 2 taken along the plane 5-5 illustrated in FIG. 3.
Figure 6:
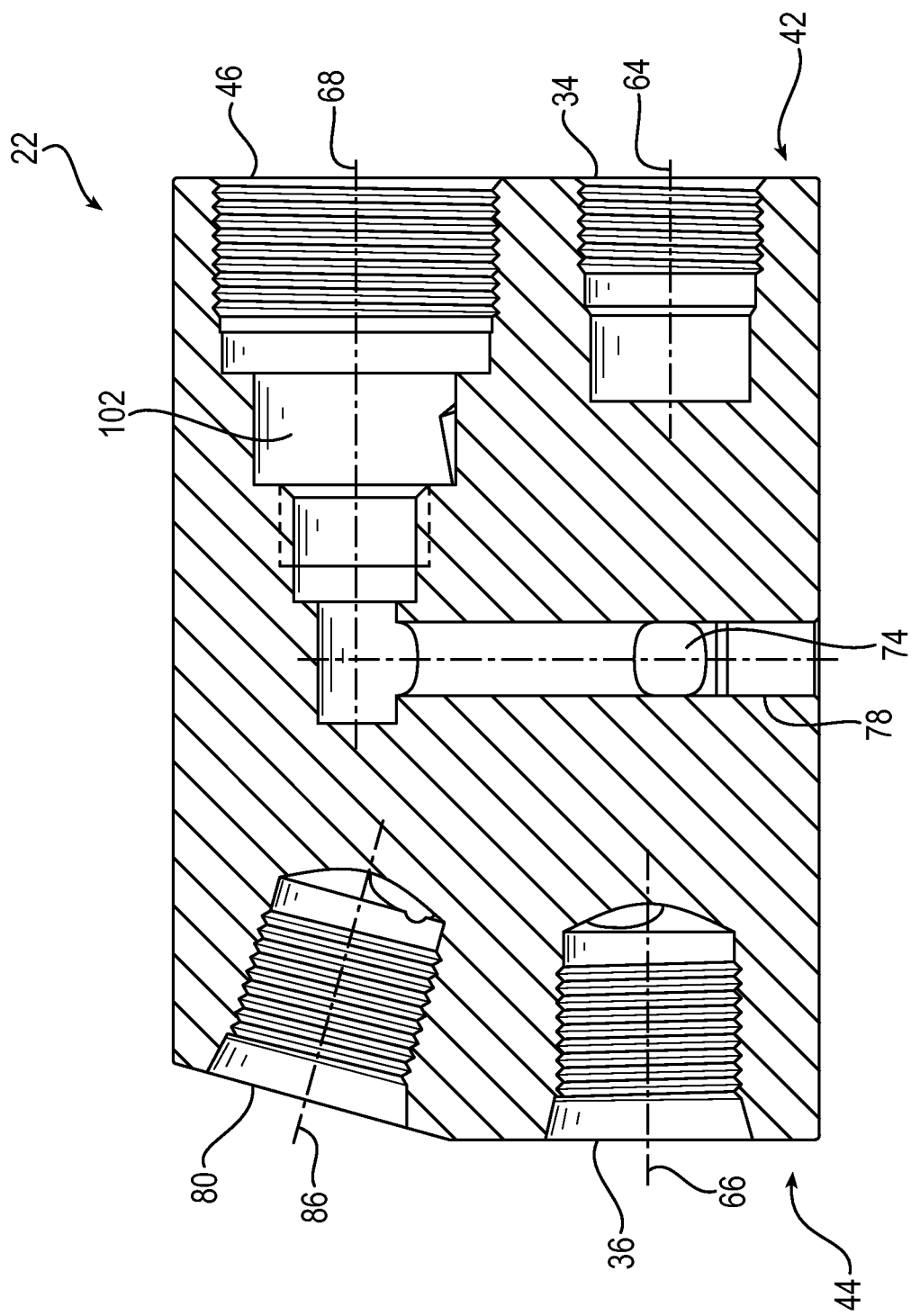
FIG. 6 is a cross-sectional view of the manifold body of FIG. 2 taken along the plane 6-6 illustrated in FIG. 3.

Turning next to FIGS. 2 to 6, the manifold body 22 is depicted separate from other components of the coupling manifold assembly 20. Each of FIGS. 4 to 6 illustrates a cross-section of the manifold body 22 taken at a respective plane 4-4, 5-5, or 6-6 of FIG. 3.

The manifold body 22 extends along a manifold body longitudinal axis 40 between a first axial end 42 and a second axial end 44 opposing the first axial end 42. The manifold body 22 has a length 50 extending along the longitudinal axis 40 between the opposing first and second axial ends 42 and 44, a lateral width 52 extending orthogonal to the length 50 between opposing lateral sides 54 and 56 of the manifold body 22, and a height 60 extending orthogonal to each of the length 50 and the lateral width 52. As depicted, the length 50 preferably is greater than either of the lateral width 52 or the height 60, with the height 60 being greater than the lateral width 52.

In one embodiment, the manifold body 22 may be dimensioned such that the coupling manifold assembly 20 may be a handheld assembly. The respective length 50, lateral width 52, and height 60 are defined relative to one another to be easily held in one's hand while connecting the coupling manifold assembly 20 to another component, such as to another coupling manifold assembly 20. Other relative dimensions may be suitable in other embodiments.

As depicted, at least one of the connection ports 34 or 36 or a regulator port 46, into which the pressure regulator 24 is received, is disposed at each of the opposing first and second axial ends 42 and 44. Particularly, the connection ports 34 and 36 are disposed opposite one another, with the first connection port 34 being disposed at the first axial end 42 and the second connection port 36 being disposed at the second axial end 44. The regulator port 46 may be received at either of the first or second axial ends 42 or 44, such as being spaced apart from the respective first or second connection port 34 or 36 at the respective first or second axial end 42 or 44. For example, as illustrated, the regulator port 46 may be spaced along the height 60 from the respective first or second connection port 34 or 36 at the respective first or second axial end 42 or 44. This arrangement of ports 34, 36 and 46 next to one another or opposing one another enables the manifold body 22 to maintain a minimized outer profile, and further for the coupling manifold assembly 20 including couplings attached to the ports 34, 36 and 46 to have a minimized profile.

To further minimize the outer profile of the manifold body 22/coupling manifold assembly 20, each of the connection ports 34 and 36 and the regulator port 46 extend along respective central longitudinal axes that extend parallel to one another. The first connection port 34 extends along a first port longitudinal axis 64, the second connection port 36 extends along a second port longitudinal axis 66, and the regulator port 46 extends along a regulator port longitudinal axis 68. Each of the axes 64, 66 and 68 is disposed in a common plane, which as depicted, is the plane 5-5 of FIGS. 3 and 5, which is the central lateral plane of the manifold body 22 disposed between the opposing lateral sides 54 and 56.

Also to minimize the outer profile of the manifold body, the passages within the manifold body 22 that define the flow path between the connection ports 34 and 36 are generally provided laterally adjacent one another. For example, a first passage 70 defines a first portion of the flow path (between the connection ports 34 and 36) extending between the first connection port 34 and the pressure regulator port 46. A second passage 72 defines a second portion of the same flow path, but extending between the second connection port 36 and the pressure regulator port 46. The first passage 70 and the second passage 72 are disposed adjacent to one another and also are disposed laterally spaced from one another along the lateral width 52, such as along their full respective lengths along the longitudinal axis 40 of the manifold body 22.

For example, a central longitudinal axis 74 of the first passage 70, which is colinear with the first port longitudinal axis 64, is disposed in the plane 5-5, while the central longitudinal axis 76 of the second passage 72 is disposed in the plane 4-4. The planes 4-4 and 5-5 are parallel to one another, but are disposed laterally spaced from one another along the lateral width 52.

As illustrated in FIGS. 5 and 6, the first passage 72 is connected to an intermediate passage 78 arranged laterally adjacent the first passage 72. The intermediate passage 78 is depicted as extending orthogonally relative to the first passage 72, such as for ease of manufacturing of the manifold body passages, but may be otherwise relatively arranged in other embodiments.

As depicted, the manifold body 22 also includes a third connection port 80 (fourth total port) that is connected within the manifold body 22 to the second flow passage 72. The third connection port 80 is provided to allow for separate connection of each of the male coupling 26 and the female coupling 28 to the manifold body 22 at an end of the flow path opposite the first connection port 34.

The third connection port 80 is spaced along the second axial end 44 from the second connection port 36, such as being spaced along the height 60 (FIG. 3) from the second connection port 36. The pair of second axial end ports 36 and 80 are spaced from one another along the second axial end 44 in the same direction as which the first connection port 34 and the regulator port 46 are spaced from one another along the opposing first axial end 42.

The illustrated third connection port 80 includes a third port longitudinal axis 86 that also is disposed in the common plane 5-5, but is set at an angle transverse the second port longitudinal axis 66. The offsetting of the connection ports 36 and 80 provides clearance between the male coupling 26 and the female coupling 28 to allow for concurrent attachment of components to each of the male coupling 26 and the female coupling 28.

A third passage 84 (FIG. 4) extends between the third connection port 80 and the second flow passage 72 at a location intermediary the second connection port 36 and the regulator port 46 along the second flow passage 72. Thus, the second connection port 36 and the third connection port 80 jointly serve as second axial end ports disposed opposite the first connection port 34 at an opposite side of the flow path through the manifold body 22.

In other embodiments, any of the passages 70, 72, 78 and 84 and longitudinal axes 64, 66, 68 and 86 may be otherwise suitably disposed. In some embodiments, the second connection port 36 or the third connection port 80 may be omitted, such as when a coupling including both male and female components is coupled at the remaining second or third connection port 36 or 80.

The general description of the manifold body 22 having a flow path extending between connecting ports at opposing ends of the flow path through the manifold body 22 may be applicable to a flow path extending between the first connection port 34 and the third connection port 80, rather than the previously described flow path extending between the first connection port 34 and the second connection port 36. It is noted, however, that the depicted third port longitudinal axis 86 is not disposed parallel to the other longitudinal axes 64, 66 and 68. In other embodiments, the height 60 may be increased to allow for parallel alignment of the second port longitudinal axis 66 and the third port longitudinal axis 86 absent interference of components that may be concurrently coupled to each of the male coupling 26 and the female coupling 28.

As depicted in each of FIGS. 4-6, the manifold body 22 may be formed as a single component of unitary construction. For example, the depicted manifold body 22 has an external profile that may be extruded with secondary machining steps forming and threading the respective ports 34, 36, 46 and 80 and forming the respective passages 70, 72, 78 and 84.

This concept is illustrated in the depicted embodiment of FIG. 6 in view of the intermediate passage 78 extending to an outer periphery of the manifold body 22 at a location spaced from any of the respective ports 34, 36, 46 and 80. The intermediate passage 78 may be machined into the manifold body 22 to connect the first connection port 34 and the regulator port 46, such as where the first passage 70 may not be easily machined between the first connection port 34 and the regulator port 46 due to the close proximity of these ports 34 and 46 and minimal outer footprint and periphery of the manifold body 22. To seal the intermediate passage 78 between the regulator port 46 and the outer periphery of the manifold body 22, a passage seal 90 (FIG. 7) is included, which may be a ball or other member that may be compressible or form an air tight seal to seal the intermediate passage 78. A different suitable seal may be used in other embodiments.

Figure 7:
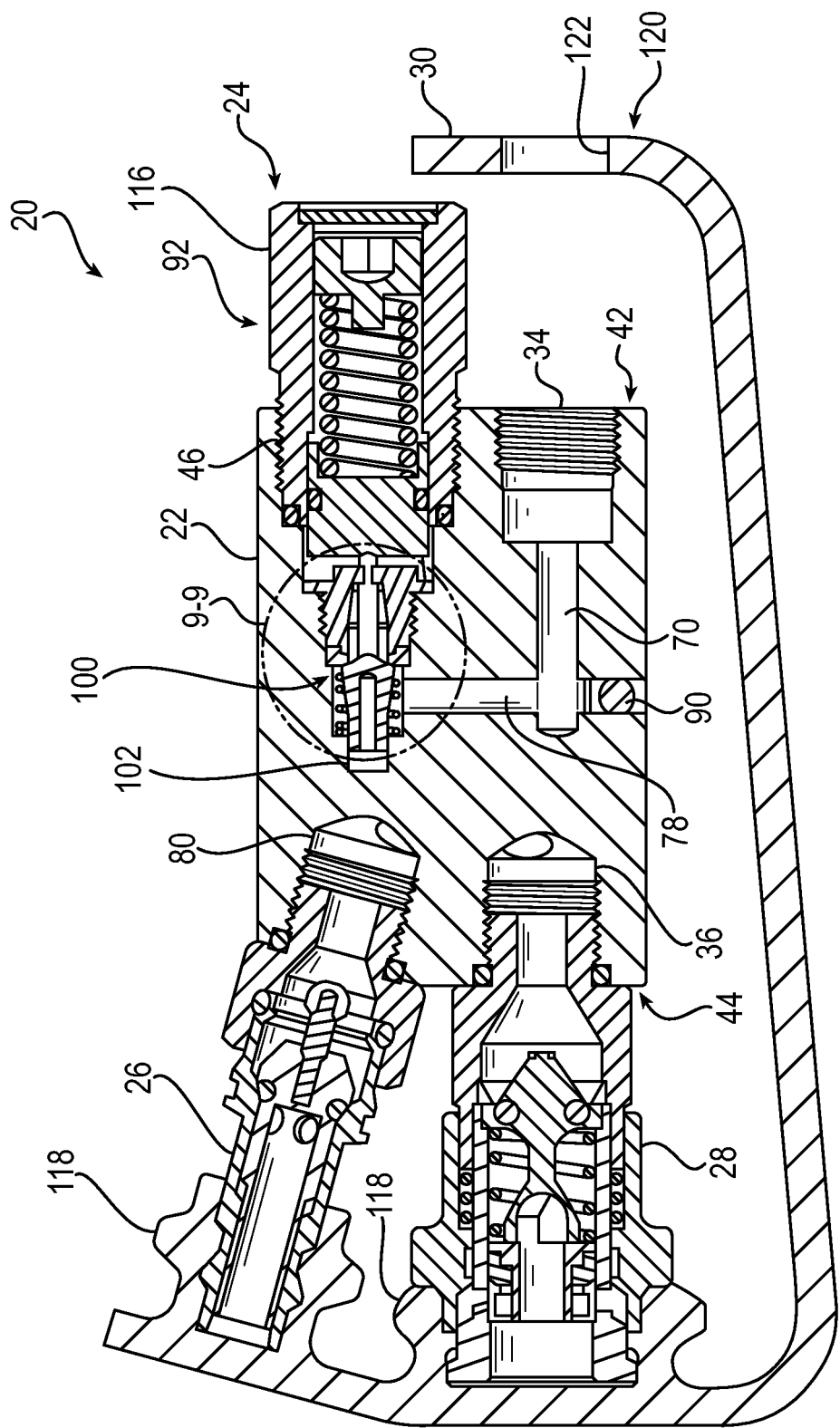
FIG. 7 is a cross-sectional view of the coupling manifold assembly of FIG. 1 taken along the plane 5-5 illustrated in FIG. 3.
Figure 8:
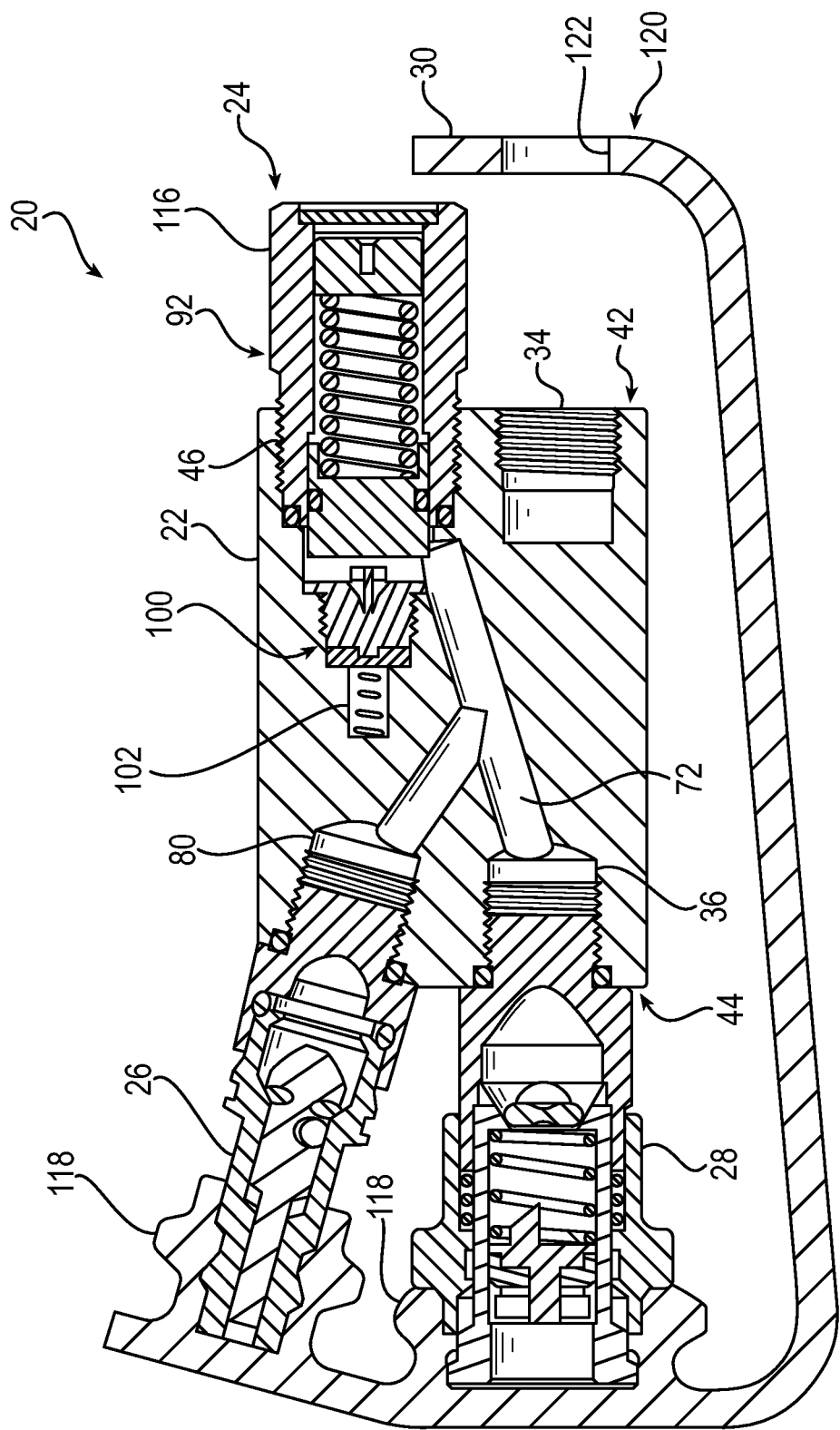
FIG. 8 is a cross-sectional view of the coupling manifold assembly of FIG. 1 taken along the plane 4-4 illustrated in FIG. 3.

Turning now to FIGS. 7 and 8, which are respectively taken along the planes 5-5 and 4-4 of FIG. 3, the coupling manifold assembly 20 is depicted in cross-section and includes each of the manifold body 22, the pressure regulator 24, the male coupling 26, the female coupling 28, and the seal member 30. The view of FIG. 7 is looking in the opposite direction along the lateral width 52 as the view of FIG. 5, while the view of FIG. 8 is looking in the same direction along the lateral width 52 as FIG. 4.

The pressure regulator 24 is coupled to the regulator port 46, such as via corresponding threads at each of the pressure regulator 24 and the regulator port 46. The pressure regulator 24 extends outwardly from the manifold body 22 such that an exterior portion 92 of the pressure regulator 24 not received into the manifold body 22 does not extend circumferentially beyond an outermost periphery of the manifold body 22 circumscribing the respective first axial end 42 or second axial end 44 at which the pressure regulator 24 is disposed, which is the first axial end 42 in the depicted embodiment. The pressure regulator 24 also does not extend circumferentially beyond an outermost periphery of the manifold body 22 circumscribing the connection ports 34, 36 and 80. When the manifold body 22 is of a different outer profile in another embodiment, one or both of these relative dispositions may not apply.

Figure 9:
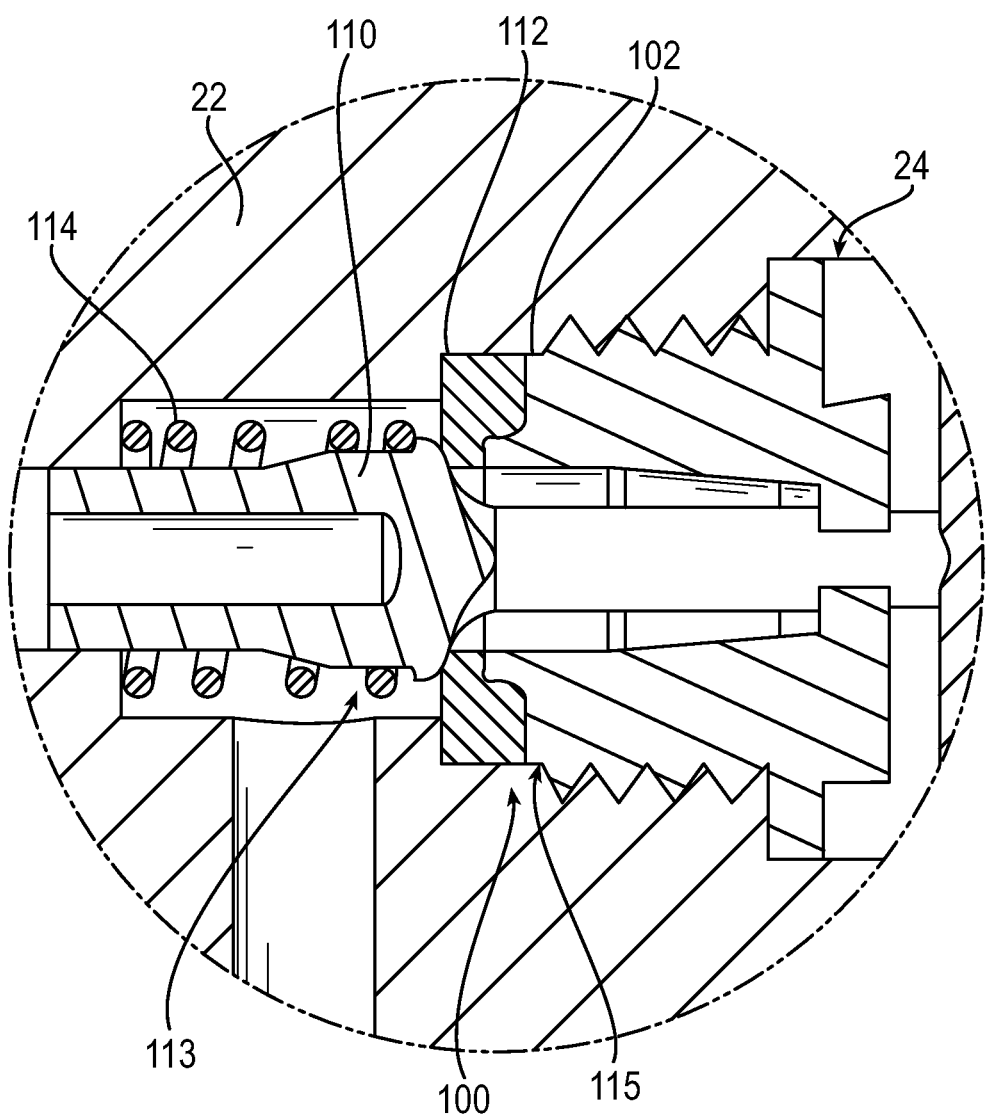
FIG. 9 is an enlarged view of a portion 9-9 of the cross-sectional view of FIG. 7.

Turning briefly to FIG. 9, and also still to FIGS. 7 and 8, a valve portion 100 of the pressure regulator 24 extends into a regulator port cavity 102 at an opposite end of the regulator port 24 from the outer periphery of the manifold body 22. The regulator port cavity 102 is disposed along the flow path (between the first connection port 34 and the second axial end ports 36 and 80) defining an intersection of the first passage 70 (via the intermediate passage 78) and the second passage 72. This disposition allows the pressure regulator 24, and particularly the valve portion 100, to be disposed between and configured to fluidly separate the first connection port 34 and the second axial end ports 36 and 80.

The valve portion 100 has a valve member 110 biased against a valve seat 112. The valve member 110 is biased by a biasing member 114, such as a spring, such as in a direction towards the axial end of the manifold body 22 at which the pressure regulator 24 is disposed. As depicted, the valve member 110 is biased towards the first axial end 42. In the depicted embodiment, the pressure regulator 24 includes an external portion 116 that is manually adjustable, such as being rotatable relative to the manifold body 22, to move the valve member 110 relative to the valve seat 112, and thereby to adjust the pressure of flow allowed through the manifold body 22 in one direction along the flow path, such as in the first direction from the connection port 34 to the pair of second axial end ports 36 and 80.

The first flow passage 70 extends from the first connection port 34 to the regulator port cavity 102 at a first side 113 of the valve seat 112. The second flow passage 72 extends from the pair of second axial end ports 36 and 80 to the regulator port cavity 102 at a second side 115 of the valve seat 112. The first side 113 and the second side 115 are fluidly sealable from one another via biasing of the valve member 110 into engagement with the valve seat 112. In this way, the pressure regulator 24 is configured to regulate only flow moving in a first flow direction from the first connection port 34, through the valve portion 110, to the pair of second axial end ports 36 and 80. Likewise, the pressure regulator 24 is configured to allow unregulated flow moving in an opposite second direction from the pair of second axial end ports 36 and 80, through the valve portion 110, to the first connection port 34.

Turning again to only FIGS. 7 and 8, the male and female couplings 26 and 28, which may be quick disconnect couplings, are shown in detail. The male coupling 26 is received in the third connection port 80, such as via corresponding threads at the coupling 26 and port 80, while the female coupling 28 is received in the second connection port 34, such as via corresponding threads at the coupling 28 and the port 34. The couplings 26 and 28 may be reversed in other embodiments, or two male couplings 26 or two female couplings 28 may be provided. Inclusion of each a male coupling 26 and a female coupling 28 allows for ease of intercoupling of a pair of coupling assemblies 20 to one another, such as directly to one another. For example, the male and female couplings 26 and 28 are configured such that the male coupling 26 may be received directly into the female coupling 28. In such case, one connection port 36 or 80 of each of second axial ends 44 of a pair of coupling manifold assemblies 20 may be intercoupled to one another.

The sealing member 30 is connectable to each of the couplings 26 and 28 to seal the respective connection ports 36 and 80. Particularly, the sealing member 30 may be configured to connect to one or both of the couplings 26 and 28. The shape of the sealing member 30 and a material of the sealing member 30 allow for flexibility of the sealing member 30, such as between adjacent sealing portions 118, allows for this versatility.

The sealing member 30 also has a tail end 120 disposed opposite the sealing portions 118, which is configured to circumscribe a connection or coupling, such as one received into the first connection port 34. For example, the tail end 120 may have a passage 122 through the tail end 120 for receiving the respective connection/coupling. Alternatively, depending on the material of the sealing member 30, the tail end 120 may be wrapped about and extend through the passage 122, with the tail end 120 disposed about the connection/coupling, but the connection/coupling not extending through the passage 122.

Figure 10:
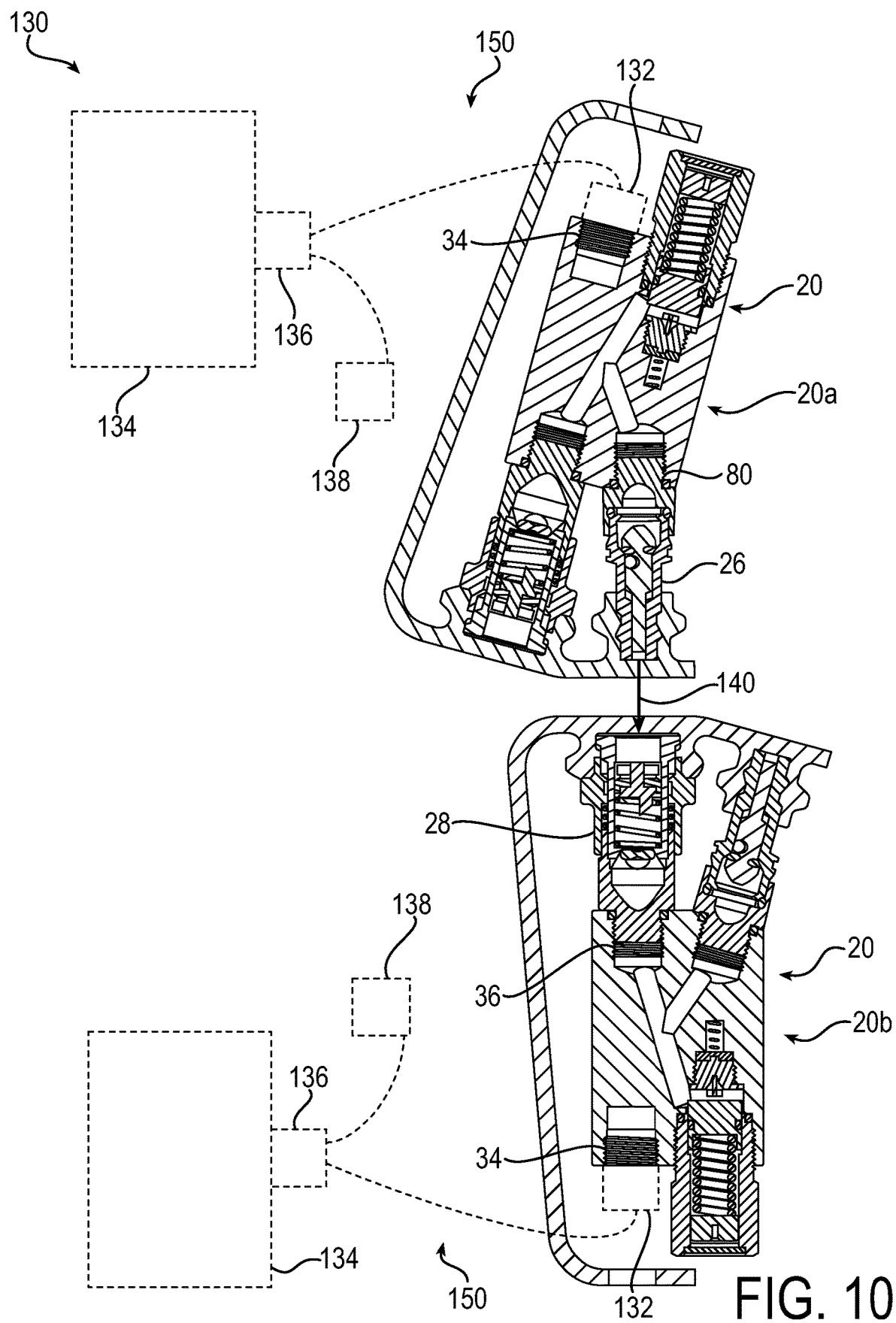
FIG. 10 is a schematic view of a manifold system include a pair of coupling manifold assemblies of FIG. 1.

Turning next to FIG. 10, a manifold system 130 is depicted including a first coupling manifold assembly 20a and a second manifold assembly 20b each according to an embodiment of the present invention. Each of the coupling manifold assemblies 20 (20a and 20b) has a supply coupling 132 received at the respective first connection ports 34. Connected to each of the coupling manifold assemblies 20a and 20b is a supply assembly including a fluid supply 134, such as a tank containing breathing air, a tank regulating manifold 136 and a fluid output device 138, such as a breathing apparatus or breathing regulator, which may be in the form of a mask, for example. Each respective tank regulating manifold 136 couples the respective fluid supply 134 to each of the respective fluid output device 138 and the respective coupling manifold assembly 20a or 20b at the respective supply coupling 132.

As indicated schematically by an arrow 140, the male coupling 26 of the first coupling manifold assembly 20a is directly coupled to the female coupling 28 of the second manifold coupling assembly 20b. The first and second coupling manifold assemblies 20a and 20b are connected to one another such that regulated flow moving in the first direction through the first coupling manifold assembly 20a (from the respective first connection port 34 to the respective second axial end connection port 80) is receivable at the second coupling manifold assembly 20b and enabled to move unregulated in the second direction through the second coupling manifold assembly 20b (from the respective second axial end connection port 36 to the respective first connection port 34), from the fluid supply 134 connected to the first coupling manifold assembly 20a to the fluid outlet device 138 connected to the second coupling manifold assembly 20b. Flow may alternatively move from the fluid supply 134 connected to the second coupling manifold assembly 20b to the fluid outlet device 138 connected to the first coupling manifold assembly 20a, in which case flow only is regulated along such flow path by the second coupling manifold assembly 20b.

With such configuration, the second axial end connection port 80 of the first coupling manifold assembly 20a is fluidly connected to the second axial end connection port 36 of the second coupling manifold assembly 20b, and a flow path extending between the respective first ports 34 of the first and second coupling manifold assemblies 20a and 20b, and through each of the respective second axial end connection ports 36/80 of the first and second coupling manifold assemblies 20a and 20b is regulated via only one of the first coupling manifold assembly 20a or the second coupling manifold assembly 20b.

In circumstances when multiple breathing air regulating systems 150 (two are depicted in the manifold system 130 of FIG. 10) are being used by different individuals, such as being worn by a number of firefighters, for example, the coupling manifold assemblies 20 of the respective breathing air regulating systems 150 will allow for buddy breathing. In such case, when flow is compromised or supply is low with respect to a first regulating system 150, the coupling manifold assemblies 20 of respective regulating systems 150 are configured to intercouple to one another, such as without additional components. The coupling manifold assembly 20a of the first compromised regulating system 150 may be connected to the coupling manifold assembly 20b of another uncompromised regulating system 150. In such instance, with air moving through each of the intercoupled coupling manifold assemblies 20a and 20b from an air tank 134 to an outlet device or breathing regulator 138, the second coupling manifold assembly 20b will regulate air, while the first intercoupled coupling manifold assembly 20a will allow for unregulated flow of air therethrough.

In such example, each air tank 134 may have an internal pressure in the range of about 4000 psi to about 6000 psi, or about 4500 psi to about 5500 psi, or about 5000 psi. The respective tank regulating manifold 136 may be configured to down regulate such pressure to a range of about 140 psi to about 180 psi, or about 150 psi to about 170 psi, or about 160 psi. The respective coupling manifold assembly 20 may be configured to further down regulate the pressure coming from the tank regulating manifold 136 to a range of about 140 psi to about 155 psi, or a range of about 145 psi to about 150 psi, or about 147 psi.

The coupling manifold assembly 20 also may be configured to function at relatively cold temperatures, which temperatures in part may be caused by the gases flowing through the coupling manifold assembly 20 or the environment of use. The coupling manifold assembly may be configured to function in cold temperatures in the range of about −50 degrees F. to about −30 degrees F., or in the range of about −45 degrees F. to about −35 degrees F., or about −40 degrees F. (equal to about −40 degrees C.). This configuration may be enabled in view of the configuration of the valve portion 110 and/or the materials used in the coupling manifold assembly 20, for instance where the manifold body 22 is composed of aluminum.

In summary, a coupling manifold assembly 20 has both regulated and unregulated flow orientations and includes a manifold body 22 and a pressure regulator 24 couplably received into the manifold body 22. The manifold body 22 includes a pair of connection ports 34 and 36, or 34 and 80 between which flow is movable through the manifold body 22, with the pressure regulator 24 being received into a flow path between the connection ports 34 and 36, or 34 and 80. The pressure regulator 24 is configured to regulate flow in a first direction between the connection ports 34 and 36, or 34 and 80 and to allow for unregulated flow in an opposite second direction between the connection ports 34 and 36, or 34 and 80.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A coupling manifold assembly, comprising:
   a manifold body having a pair of connection ports including a first connection port and a second connection port between which flow is movable through the manifold body; and
   a pressure regulator couplably received into the manifold body, the pressure regulator extending into a flow path in the manifold body between the connection ports, and the pressure regulator is configured to regulate flow in a first direction between the connection ports and to allow for unregulated flow in an opposite second direction between the connection ports;
   the pressure regulator having a valve portion including a valve member biased against a valve seat; and
   the flow path including a first flow passage extending from the first connection port to a first side of the valve seat, and a second flow passage extending from the second connection port to a second side of the valve seat opposite from the first side to permit said regulated flow in the first direction and said unregulated flow in the second direction;

wherein the first flow passage and the second flow passage are disposed adjacent to one another, and wherein the first flow passage and the second flow passage are disposed laterally spaced from one another along their full lengths along a longitudinal axis of the manifold body.

2. The coupling manifold assembly of claim 1, wherein the manifold body extends along the longitudinal axis between opposing first and second axial ends and wherein at least one of the connection ports or a regulator port into which the pressure regulator is received is disposed at each of the opposing first and second axial ends.

3. The coupling manifold assembly of claim 1, wherein the manifold body has a length extending along the longitudinal axis between opposing first and second axial ends and a height extending orthogonal to the length, and wherein the pressure regulator is received into a regulator port at one of the first and second axial ends and spaced along the height from one of the connection ports disposed at the respective first or second axial end having the regulator port.

4. The coupling manifold assembly of claim 1, wherein the manifold body has a length extending along the longitudinal axis between opposing first and second axial ends, a lateral width extending orthogonal to the length between opposing lateral sides of the manifold body, and a height extending orthogonal to each of the length and the lateral width of the manifold body, and wherein the length is greater than either of the lateral width or the height.

5. The coupling manifold assembly of claim 1, wherein each of the connection ports and a regulator port into which the pressure regulator is couplably received extend along respective central longitudinal axes, with each of the respective central longitudinal axes extending parallel to one another.

6. The coupling manifold assembly of claim 1, wherein the pressure regulator extends outwardly from the manifold body such that an exterior portion of the pressure regulator not received into the manifold body does not extend circumferentially beyond an outermost periphery of the manifold body circumscribing both of the connection ports.

7. The coupling manifold assembly of claim 1, wherein the pressure regulator is manually adjustable to adjust the pressure of flow allowed through the manifold body in the first direction.

8. The coupling manifold assembly of claim 1, wherein the pressure regulator includes a valve portion having a valve member biased against a valve seat, the valve portion is disposed between and configured to fluidly separate the connection ports from one another within the manifold body.

9. A coupling manifold assembly, comprising:
a manifold body having a pair of connection ports including a first connection port and a second connection port between which flow is movable through the manifold body; and
a pressure regulator couplably received into the manifold body, the pressure regulator extending into a flow path in the manifold body between the connection ports, and the pressure regulator is configured to regulate flow in a first direction between the connection ports and to allow for unregulated flow in an opposite second direction between the connection ports;
the pressure regulator having a valve portion including a valve member biased against a valve seat; and
the flow path including a first flow passage extending from the first connection port to a first side of the valve seat, and a second flow passage extending from the second connection port to a second side of the valve seat opposite from the first side to permit said regulated flow in the first direction and said unregulated flow in the second direction;
wherein the coupling manifold assembly further includes a coupling received into one of the connection ports and a flexible sealing member connectable to the coupling to seal the respective connection port.

10. The coupling manifold assembly of claim 9, wherein the flexible sealing member has a tail end configured to circumscribe a connection received into the other of the connection ports.

11. A manifold system including a first coupling manifold assembly and a second manifold assembly each according to claim 1, wherein the first and second coupling manifold assemblies are connected to one another such that regulated flow moving in the first direction through the first coupling manifold assembly is receivable at the second coupling manifold assembly and enabled to move unregulated in the second direction through the second coupling manifold assembly.

12. A coupling manifold assembly, comprising:
a manifold body extending along a longitudinal axis between first and second axial ends;
a first port extending into the first axial end for receiving a coupling connectable to a flow source;
a pair of second axial end ports extending into the second axial end for receiving a coupling connectable to an outlet device, the pair of second axial end ports being spaced from one another along the second axial end;
a regulator port extending into the first axial end to a regulator port cavity within the manifold body for receiving a pressure regulator, the regulator port being spaced apart from the first port along the first axial end;
a pressure regulator received in the regulator port and into the regulator port cavity, the pressure regulator having a valve portion of the pressure regulator disposed in a path of flow extending from the first port to the second port, and the valve portion having a valve member biased against a valve seat;
a first flow passage extending from the first port to the regulator port cavity at a first side of the valve seat; and
a second flow passage extending from the pair of second axial end ports to the regulator port cavity at a second side of the valve seat fluidly sealable from the first side of the valve seat via biasing of the valve member into engagement with the valve seat,
wherein the pair of second axial end ports are connected within the manifold body to one another along the second flow passage intermediary of a connection of each of the second axial end ports to the regulator port cavity, and
wherein the pressure regulator is configured to regulate only flow moving in a first flow direction from the first port through the valve portion to the pair of second axial end ports and is configured to allow unregulated flow moving in an opposite second direction from the pair of second axial end ports through the valve portion to the first port.

13. The coupling manifold assembly of any of claim 12, wherein the pair of second axial end ports are spaced from one another along the second axial end in the same direction as which the first port and the regulator port are spaced from one another along the opposing first axial end.

\* \* \* \* \*